US010445383B1

United States Patent
Zgraggen et al.

(10) Patent No.: US 10,445,383 B1
(45) Date of Patent: *Oct. 15, 2019

(54) INTEREST RELATED SEARCH RESULTS

(71) Applicant: Amazon Technologies, Inc., Seattle, WA (US)

(72) Inventors: Guido Beat Zgraggen, Seattle, WA (US); James Emmett Stevenson, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

This patent is subject to a terminal disclaimer.

(21) Appl. No.: 14/934,020

(22) Filed: Nov. 5, 2015

Related U.S. Application Data

(62) Division of application No. 13/691,576, filed on Nov. 30, 2012, now Pat. No. 9,218,392.

(51) Int. Cl.
*G06F 16/9535* (2019.01)
*G06F 16/248* (2019.01)
*G06F 16/2453* (2019.01)
*G06F 16/2457* (2019.01)

(52) U.S. Cl.
CPC ........ *G06F 16/9535* (2019.01); *G06F 16/248* (2019.01); *G06F 16/24539* (2019.01); *G06F 16/24575* (2019.01)

(58) Field of Classification Search
None
See application file for complete search history.

(56) References Cited

U.S. PATENT DOCUMENTS

| | | | |
|---|---|---|---|
| 2003/0046281 A1* | 3/2003 | Son ................... | G06F 17/30876 |
| 2008/0215453 A1* | 9/2008 | Yoshii .................... | G06Q 30/02 705/7.29 |
| 2009/0303238 A1* | 12/2009 | Lam .................. | G06F 17/30389 345/440 |
| 2010/0312779 A1* | 12/2010 | Lim ..................... | G06F 17/3064 707/759 |
| 2011/0191364 A1* | 8/2011 | LeBeau ............. | G06F 17/30672 707/767 |
| 2012/0284145 A1* | 11/2012 | Kalin ................. | G06Q 30/0631 705/26.7 |
| 2012/0284293 A1* | 11/2012 | Nierenberg ......... | G06F 17/3097 707/766 |
| 2013/0110823 A1* | 5/2013 | Su ..................... | G06F 17/30867 707/723 |
| 2013/0173569 A1* | 7/2013 | Pearcy ................... | G06F 17/30 707/706 |
| 2013/0282440 A1* | 10/2013 | Isaac ..................... | G06Q 30/02 705/7.35 |
| 2014/0046934 A1* | 2/2014 | Zhou ................. | G06F 17/30864 707/723 |
| 2014/0067477 A1* | 3/2014 | Zhao ....................... | G06Q 30/02 705/7.34 |
| 2014/0146082 A1* | 5/2014 | So ....................... | G06K 9/00671 345/633 |

* cited by examiner

*Primary Examiner* — Wilson Lee
(74) *Attorney, Agent, or Firm* — Thorpe North & Western, LLP.

(57) ABSTRACT

Technology is described for providing search results based on a search query. The method may include receiving the search query. A user interest based on the search query may also be identified. The user interest may be compared with currently trending interests. Interest items based on the currently trending interests that relate to the user interest may be identified.

13 Claims, 11 Drawing Sheets

ACME Online Store 610    Hello! | Your Account | Help

Search [Dept. ∨]   Search Term: "Magic Kingdom Wand"   620   (Go)

Showing 1-2 of 50 Results    Sort by: [Price ∨]    630

1   Magic Kingdom Wand
    XYZ Corp.
    Price: $9.99        640
    ★★★★⯪

2   Magic Kingdom Wand
    ABC Corp.
    Price: $19.99       650
    ★★★★☆

PRODUCTS YOU MIGHT LIKE:    660

Since it is currently time to [GO BACK TO SCHOOL]  670
you may find the following products related to your
search "magic kingdom wand" interesting:

1   Magic Kingdom Lunchbox
    XYZ Corp.
    Price: $19.99       680
    ★★★★⯪

2   Magic Kingdom Backpack
    ABC Corp.          690
    Price: $49.99
    ★★★★☆

FIG. 6

INTEREST RELATED SEARCH RESULTS

INTEREST RELATED SEARCH RESULTS

This application is a Divisional of U.S. patent application Ser. No. 13/691,576, filed on Nov. 30, 2012, which is incorporated herein by reference.

BACKGROUND

With the enormous amount of information available on the Internet, users frequently use search engines to find information. For example, a user interested in cooking recipes may use a search engine to find certain recipes. While some search engines may allow users to find information on the entire Internet, other websites may have search engines for finding information on that particular website. For example, a car dealership website may allow users to search for available car models at the dealership. In this case, the user may enter a search phrase or a question into the search query box, and generally the search engine may provide relevant search results.

Search engines may utilize a number of techniques to find the most relevant search results. For example, search engines may look for content that may contain the same text as the search terms entered by the user. After entering a search term into a search engine, a list of matching search results may be provided. With the billions of pages on a multitude of websites, it is likely that many pages contain the same search terms entered by the user. Thus, a search may often produce a large number of results. Search engines may attempt to simplify the search results by displaying highly relevant or highly rated search results on the top of the display.

BRIEF DESCRIPTION OF THE DRAWINGS

The accompanying drawings illustrate a number of technology examples and are a part of the specification. Together with the following description, these drawings demonstrate and explain various aspects of the present disclosure.

FIGS. 3-6 are drawings that depict a user interface rendered by various clients according to various examples of the present disclosure.

Figure 1:
FIG. 1 is an illustration that depicts a user interface rendered by a client according to various examples of the present disclosure.

Throughout the drawings, identical reference characters and descriptions indicate similar, but not necessarily identical, elements. While the examples described herein are susceptible to various modifications and alternative forms, specific examples have been shown in the drawings and will be described in detail herein. However, the examples described herein are not intended to be limited to the particular forms disclosed. Rather, the present disclosure covers all modifications, equivalents, and alternatives falling within the scope of the appended claims.

DETAILED DESCRIPTION

The technology provides interest items related to search results. For example, a user may enter a search query (e.g., a favorite superhero) into a page search engine. Due to the extremely large number of pages that may currently exist in a search space, the user may be presented with thousands, if not hundreds of thousands, of search results (e.g., pages and/or items that contain the same key words as searched by the user). These search results may include purchasable products related to a superhero. In this example, the large number of products related to the superhero may be displayed in a prioritized list order, such as the highest rated products being displayed first. While some of the products may be related to the user's search query, often times, many of the products are uninteresting to the user. In other words, many of the products may have some key word relation to the superhero but are not tied to the user's current interests in the superhero. For example, the search for the user's favorite superhero may result in a large number of certain items (e.g., movies), while the user may actually be more interested in different items related to the superhero (e.g., comic books, costumes). Furthermore, the user may be interested in similar superhero items (e.g., action figures) that other users have also shown interest in but the search results do not reflect these currently trending interests.

In order to suggest more relevant products to the user, the search results may include various interest items related to the user interests. The interest items may include individual items, products, categories of products, and/or content related to the user interests. The interest items may be displayed as part of the search results (e.g., on the right-hand side of the display screen). The user interests may be determined based on the terms of the user's search query and currently trending interests of other users using the search engine. For example, a user may enter the search term "The Knight movie props" as a search query. A determination may be made that the user interests relate to "The Knight" movie props. In addition, interest items may be suggested to the user based on currently trending interests identified using recent searches from other users. For example, the interest items may include particular models of swords and/or weaponry used by specific characters in the movie. The interest items may include "Zenon battle armor" worn by the character "Vernon the Brave" from the movie "The Knight." In other words, the interest items displayed to the user may be based on comparing currently trending searches with the user interests based on the user's search query.

For example, a user may search for a popular science fiction movie on a search engine. The search engine may determine that, in a recent time period, other users who have also searched for the same science fiction movie also included additional search terms. For example, other users may have recently searched for costumes, toys, and/or replica weapons related to the same science fiction movie. The recent time period may limit the searches used to identify trending interests to searches performed within the last day, two days, three days, week, month and/or another recent time period. In this example, in response to the user searching for the science fiction movie, the interest based search results may display "costumes," "toys," and "replica weapons" as product categories, due to the recent popularity of these search terms. Furthermore, the product categories may be displayed in a particular order. For example, the ordering may be based on the popularity of the search terms associated with the product category. Therefore, if the highest number of search queries were related to toys from the science fiction movie, then "toys" would be displayed as the first product category in the search results.

In some embodiments of the technology, the product categories may be related to current events and/or time periods. For example, a user may enter "action movie Dark Hour" as a search query during the month of September. The search engine may be programmed to know that September is the month for many children to go back to school. Therefore, some of the product categories displayed may relate to the "back to school" time period. For example, the search for "action movie Dark Hour" may result in product categories related to "Dark Hour backpacks" and/or "Dark Hour lunch boxes." The product categories may be ranked in an order based on the popularity of the products. As another example, if the same search is entered during the month of October, the product categories may be related to "Dark Hour costumes," due to the proximity of Halloween.

In some embodiments of the present disclosure, the product categories may be related to the same product the user searched for, but each product category may include a different characteristic for that product. For example, a user may search for an item using general terms (e.g., "headphones"). The general search term may be a result of the user being unfamiliar with the different types or characteristics of headphones. Using this example, the search engine may display different product categories all related to headphones. For example, the product categories may include "headphones with microphones," "headphones with volume control," "headphones by brand Orange," and/or "headphones compatible with product Nebula." The product categories may be based on similar searches performed by experts more familiar with headphones. By displaying product categories based on searches made by other users or experts with additional knowledge about headphones, a user with less knowledge on headphones may benefit by learning about trending headphone types and/or models.

In some examples of the present technology, the search queries entered by the users may be organized and stored as an ontology. In other words, the relationships between different user interests may be stored as a dynamic topical model which can be used to provide improved search results to users. For example, based on related search queries, the technology may determine that users who search for first person shooter computer games may also be interested in first person shooter video games. Thus, the relationships between different user interests may be stored in a data store, and this information may be used to provide users with more relevant and meaningful search results. As another example, the technology may determine that "movie character Albus" and "video game character Silas" are popular trending costumes. Thus, this information may be stored in a costumes ontology. In other words, when a user searches for costumes related to characters Albus and Silas, the information stored in the costumes ontology may be used to provide the user with relevant and interesting products. In some examples, the ontology may dynamically change over time based on the user queries. For example, if users interested in "movie The Knight swords" were historically also interested in "television show The Enforcers shields," but this group of users have recently become more interested in "computer game Droids swords," then the ontology may gradually change to reflect this shift. In general, the ontology may be created and modified based on the information learned from the trending user interests.

FIG. 1 illustrates an exemplary user interface 100 associated with the present technology. In the exemplary user interface, a user may search for products on the ACME online store 110. For example, the user may enter the search term "blaze man movies" into a search box 120, where the search relates to movies based on the fictional character "Blaze Man." As shown by the search results 130, the relevant and/or highest rated movies may appear at the top of the display listing. For example, the search results 130 may include Blaze Man III 140, Blaze Man II 150, Blaze Man Genesis 160, and/or Blaze Man Forever 170. In addition, the right-hand section of the display 180 may display some possible search refinements. In some examples, the possible search refinements may be included in other areas of the display screen. The search refinements may include product categories that the user may find interesting based on the user's search. In particular, the product categories may be determined from related trending search terms from other users within a recent time period. In this example, the product categories may be based on recent user searches related to "Blaze Man" from other users, such as Blaze Man toys, Blaze Man costumes, Blaze Man posters, Blaze Man action figures, and/or Blaze Man soundtracks. In addition, the product categories be displayed in a particular order (e.g., according to popularity, most recent, oldest, etc.).

Figure 2:
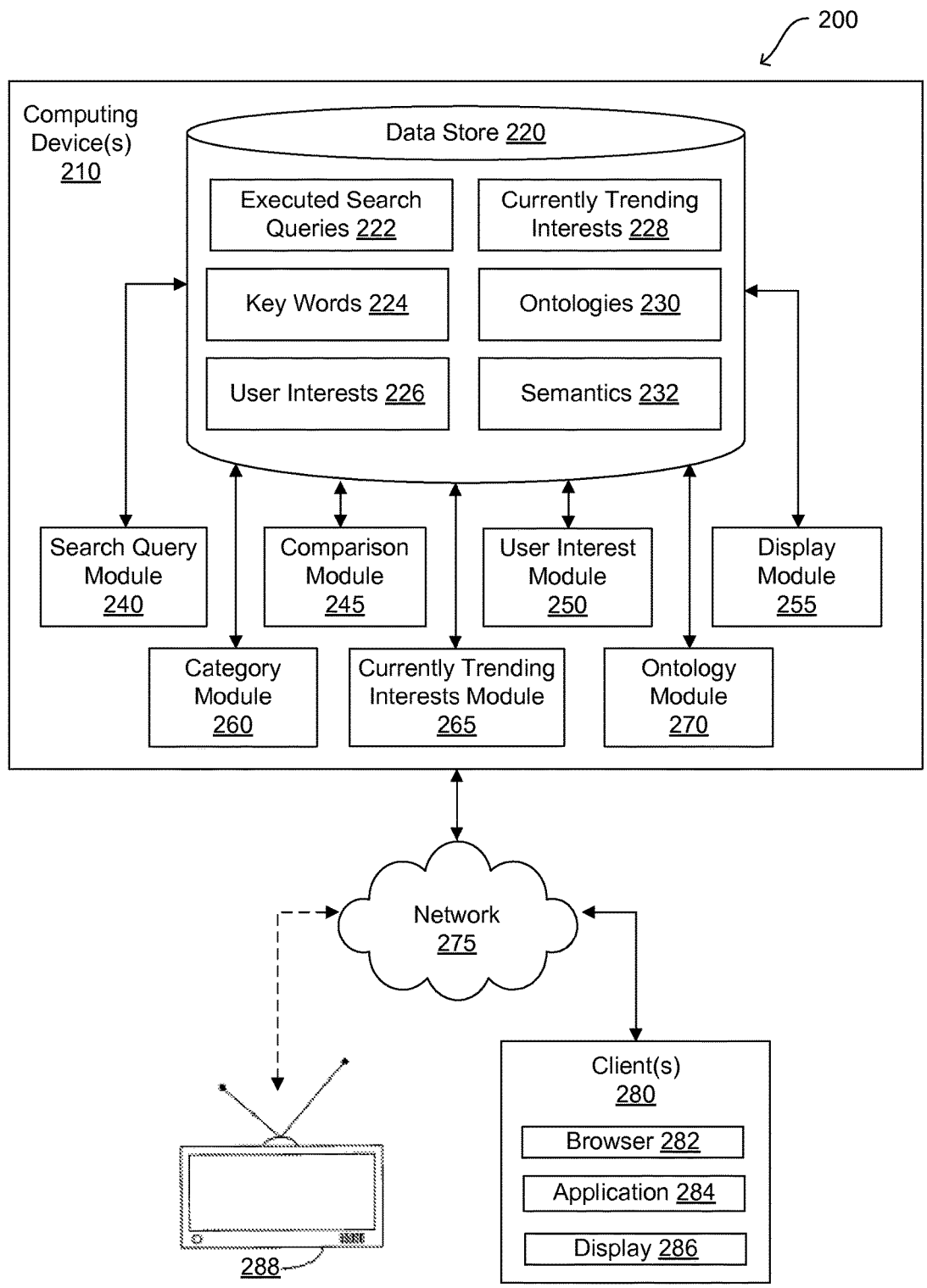
FIG. 2 is an illustration of a networked environment according to various examples of the present disclosure.

In the following discussion, a general description of the system and the system's components is provided, followed by a discussion of the operation of the same. FIG. 2 shows a networked environment 200 according to various examples of the present technology. The networked environment 200 may include one or more computing devices 210 in data communication with a plurality of clients 280 by way of a network 275. The network 275 may include the Internet, intranets, extranets, wide area networks (WANs), local area networks (LANs), wired networks, wireless networks, or other suitable networks, etc., or any combination of two or more such networks. The networked environment 200 may also include one or more content display devices 288, such as tablets, laptops, personal computers, cell phones, and so on, which may or may not be coupled to the network 275.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a cloud computing resource, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The clients 280 and 290 are representative of a plurality of client devices that may be coupled to the network 275. The clients 280 and 290 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability. The clients 280 and 290 may include a respective display 286 and 296, as well as a browser 282 and 292. The browser 282 and 292 may be executed in a client 280 and 290, for example, to access and render network pages, such as web pages, or other network content served up by the computing device 210 and/or other servers. The display 286 and 296 may comprise, for example, one or more devices such as cathode ray tubes (CRTs), liquid crystal display (LCD) screens, gas plasma-based flat panel displays, LCD projectors, or other types of display devices, etc.

The clients 290 may be configured to execute various applications such as a browser 292, and/or other applications 294. The applications 294 may correspond to code that is executed in the browser 292. The applications 294 may correspond to standalone applications, such as mobile applications. In addition, the client 290 may be configured to execute applications 294 that include, but are not limited to, mobile applications, email applications, instant message applications, and/or other applications.

Various applications and/or other functionality may be executed in the computing device 210 according to various embodiments. Also, various data is stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, is associated with the operation of the various applications and/or functional entities described below.

The data stored in the data store 220 may include executed search queries 222, key words 224, user interests 226, currently trending interests 228, and/or ontologies 228. The executed search queries 222 included in the data store 220 may include the executed search queries from a plurality of users. In addition, the executed search queries 222 may include prior search queries. For example, the search terms "movie costumes" and "movie props" entered by a user may be stored in the executed search queries 222. In some embodiments, the executed search queries 222 may include search queries from a predefined time period (e.g., a day, two days). In some embodiments, the executed search queries 222 may include search queries that are determined to be of low specificity. For example, the executed search queries 222 may include search phrases (e.g., "product Lizard with built-in speakers"), search questions (e.g., "where can I find a Lizard with built-in speakers?"), and/or individual search terms (e.g., headphones, televisions).

The key words 224 included in the data store 220 may include a plurality of key words. The key words 224 may be useful for determining the meaning of the executed search queries. For example, a search query may contain excess or unimportant search terms (e.g., "Lizard that also have built-in speakers included with it"). In this example, the key words "Lizard" and "built-in speakers" may be included in the key words 224. The key words 224 may be accessed by other modules and/or processes to aid in determining the specificity of the content and/or subject matter of the executed search queries 222. The key words 224 may include key words and/or phrases for a large number of products, services, items, etc.

The user interests 226 included in the data store 220 may include an extensive interests of a plurality of users. As used herein, the term "interest" generally refers to something that concerns, involves, draws the attention of, and/or arouses the curiosity of a user. In general, a user interest may include a wide variety of areas related to an original search. For example, a user interest may include, but is not limited to, specific products (e.g., bicycles, portable music players), specific product brands (e.g., Lizard), specific subject areas (e.g., science, mathematics), and/or specific services (e.g., video subscription services, data storage services). In some embodiments, the user interests 226 may be determined from the executed search queries 222. Additionally, the user interests 226 may be determined from the executed search queries 222 of a specific time period (e.g., past three days).

The currently trending interests 228 included in the data store 220 may include user interests within a recent time frame. In some examples, the currently trending interests may be the most popular user interests from the past day, two days, three days, week, and/or month. In general, the currently trending interests 228 may include a wide variety of areas derived from user's search terms. For example, the currently trending interests from the past week may be related to "Brand Lizard" portable music players and "Brand Lizard" cell phones. In some embodiments, the currently trending interests 228 may be determined from the executed search queries 222. Furthermore, the currently trending interests 228 may dynamically vary based on the executed search queries 222. For example, the currently trending interests 228 may include "Brand Pumps" sneakers on Monday, but may switch to "Brand Kicks" sneakers by Wednesday. In some examples, the currently trending interests 228 may store past trending interests. For example, even though "Brand Pumps" sneakers are not currently trending, the data store 220 may store the time period (and other statistics) of when "Brand Pumps" sneakers were currently trending interests among users.

The ontologies 230 included in the data store 220 may include models that describe the relationships between different user interests and/or currently trending interests. For example, the ontologies 230 may include similarities and differences between various user interests. In addition, the ontologies 230 may include inferences and/or assumptions about user interests based on information already existing in the ontologies 230. For example, the ontologies 230 may include a model based on the information that users who like "Fish televisions" also like "Starfish televisions." In addition, the model may include the information that users who like "Fish televisions" also like "Frog stereo systems." As another example, the model may include the information that users who like "Fish televisions" do not like "Shark televisions." In some embodiments, the ontologies 230 may become smarter over time, as the ontologies 230 utilize more information about user interests and currently trending interests. In some embodiments, the ontologies 230 may include ontologies for separate categories (e.g., children's costumes ontology, video game ontology).

The semantics 232 included in the data store 220 may include models that describe specific relationships between different user interests and/or currently trending interests.

For example, the semantics 232 may include similarities between various user interests. For example, the semantics 232 may include a model based on the information that users who like "Galaxy Wars Ultra Space Rocket Ships" also like "Galaxy Wars Deep Space Flying War Ships." In other words, the semantics 232 includes information describing a detailed relationship between the two different aircrafts. Generally speaking, the semantics 232 may include information describing a relationship between different items, as well as inferring relationships based on the similarity of different items. In addition, the semantics 232 may become smarter over time, as the semantics 232 utilize more information about user interests and currently trending interests.

The components executed on the computing device 210 may include a search query module 240, a comparison module 245, a user interest module 250, a display module 255, a category module 260, a currently trending interests module 265, an ontology module 270, and other applications, services, processes, systems, engines, or functionality not discussed in detail herein.

A search query module 240 may be programmed to receive a search query from a user. For example, the user may enter "Artist Princess Pri music" as a search query into a search engine. As another example, the user may enter "newest CD from the artist Princess Pri" as a search query into a webpage search engine.

The search query module 240 may be further programmed to determine whether the search query has general terms. In other words, the search query module 240 may determine whether the search query is a generic or non-specific search query. In some embodiments, the search query module 240 may determine that the search query is generic by analyzing the key words, either separately or in combination with each other, to determine the specificity of the search query. In some examples, the search query module 240 may compare the search query with executed search queries 222 of known complexity. Upon the determination that executed search queries are of similar subject matter and/or scope to the search query, the search query module 240 may determine that the search query contains generic search terms. For example, the search query module 240 may determine that the search terms "Orange music players" includes generic search terms. In contrast, the search query module 240 may determine that the search terms "Orange music player, model X with 150 GB (gigabytes) of storage, green color, ultra headphones included" includes specific search terms. In this example, the search terms are for a very specific model type, so the search query module 240 may not consider this search query to be general or non-specific.

A comparison module 245 may be programmed to compare the search query having general search terms with the executed search queries 222. For example, the comparison module 245 may compare the search query (e.g., "Dolores costumes," where Dolores is a science-fiction movie character) with the executed search queries 222 of a predefined time period (e.g., the past one week). Based on the comparison, the comparison module 245 may identify the executed search queries 222 that are related to the search query. In some examples, search queries may be related if they include the same key words. For example, the comparison module 245 may analyze the executed search queries 222, and based on the analysis, determine that the executed search queries "Dolores hats," "Dolores capes," and "Dolores swords" may be related to the search query "Dolores costume" because the character "Dolores" is common among all of the search queries. In some embodiments, search queries may be related if they both relate to similar ideas and/or subject matters. Using the previous example, the comparison module 245 may analyze the executed search queries 222, and based on the analysis, determine that the executed search queries "Maggie costumes," and "Wilma swords" may be related to the search query "Dolores costumes," because "Maggie" and "Wilma" are both movie characters from a similar genre.

A user interest module 250 may be programmed to identify a user interest based on the executed search queries 222 that are related to the search query. A user interest may include areas that the user is likely interested in based on the user's own search query in relation to the executed search queries 222. For example, the comparison module 245 may determine that the executed search queries "Dolores hats," "Dolores capes," and "Dolores swords" may be related to the user's search query "Dolores costume." In this example, the user interest module 250 may determine a user's interest areas based on the related search queries. For example, the user interest module 250 may determine that the interest areas may include Dolores apparel (e.g., Dolores hats, Dolores capes, Dolores costumes), Dolores weapons (e.g., Dolores swords), and apparel and/or weapons from similar characters to Dolores from similar science fiction movies. In general, the interest areas may be broader categories that encompass the subject matter found in the search queries. For example, the user interest module 250 may determine a user's interest in the broader category of "Dolores apparel" based on related executed search queries of "Dolores hats" and "Dolores capes."

The user interest module 250 may determine interest items related to the user's identified interest. As used herein, the term "interest items" generally refers to any item (e.g., a product, a service, a webpage link, an image) that may be of interest to the user. In some examples, the user interest module 250 may determine the interest items after determining the user interests. For example, the user interest module 250 may determine that that the user's interest areas may include Dolores apparel, Dolores weapons, and apparel and/or weapons from similar characters to Dolores from similar science fiction movies. Based on this information, the user interest module 250 may determine interest items that the user may find interesting. In other words, the user interest module 250 may recommend products and/or services based on the user interests. For example, the user interest module 250 may identify similar Dolores hats and capes for purchase, similar Gwen (a similar character from a similar science fiction movie) swords for purchase, a webpage reference discussing the design of Dolores apparel, photos from a Dolores-themed costume party, and/or a streaming movie service that streams movies of a similar genre. The example interest items are related to the user's interests, so it is likely that the user may be interested in purchasing and/or viewing these items as well.

The display module 255 may display the interest items to the user in a network page along with the search results. In other words, the search query entered by the user may result in general search results, but other search result information (e.g., interest items) may also be displayed. In some examples, the display module 255 may display the interest items alongside with the main search results. In some examples, the display module 255 may display the interest items in a separate section of the network page. For example, the interest items may be displayed together on the right-hand side of the display screen. In some configurations, the display module 255 may display the interest items on the top of the display screen (e.g., as a ribbon). In other examples, the display module 255 may display subject groupings (e.g., expert groupings), where the interest items are included in the subject groupings.

The category module 260 may categorize the interest items (e.g., related products, services, webpage links, etc.) into subject groupings prior to the display module 255 displaying the subject groupings in a network page along with the search results. For example, the category module 260 may categorize related interest items (e.g., Dolores hats) into the same subject grouping. In addition, the subject grouping "Dolores Hats" may include the available Dolores hats (e.g., Dolores hats of different styles, models, prices). As an additional example, page links related to Dolores apparel may be under the subject grouping "Dolores Links," and clicking on the subject grouping may enable the user to access the individual page links.

The currently trending interests module 265 may identify currently trending interests by analyzing the executed search queries 222. In other words, by analyzing the executed search queries 222 for a given time period (e.g. the past two weeks), the currently trending interests module 265 may identify recently popular search terms. For example, the currently trending interests module 265 may determine that a large number of search queries from the past week have revolved around the fantasy film "Hero," and in particular, Hero crowns, Hero badges, and Hero whips. In other words, the crowns, badges, and whips of the fantasy film "Hero" may be a currently trending interest. In some embodiments, the currently trending interests module 265 may identify currently trending interests by analyzing the frequency of related and/or similar executed search queries. In some examples, the currently trending interests module 265 may compare the currently trending interests with the user interest, as determined by the user interest module 250. After the comparison, the currently trending interests module 265 may determine interested items related to both the user interest and the currently trending interests. For example, the currently trending interests module 265 may compare the currently trending interest (e.g., Hero whips) with a user interest (e.g. Dolores swords), and based on the determination that both the interests revolve around movie character weapons, the currently trending interests module 265 may identify interest items related to different movie character weapons.

The ontology module 270 may create ontologies 230 based on relationships between different user interests and/or currently trending interests. In some examples, the ontology module 270 may create the ontology 230 by identifying user interests that are related. In addition, the ontology 230 may include inferences and/or assumptions about user interests based on information already existing in the ontologies 230 included in the data store 220. For example, the ontology module 270 may create the ontology 230 based on the information that users who like "Fish televisions" also like "Starfish televisions." From this information, the ontology module 270 may infer that users who like "Fish" televisions also like "Frog" televisions, based on the similarities between Fish and Frog televisions. In addition, the ontology 230 may include the information that users who like "Fish televisions" do not like "Shark televisions." In some embodiments, the ontology module 270 may create ontologies that become smarter over time, as the ontologies 230 gain additional information about user interests and currently trending interests. In some embodiments, the ontology module 270 may create separate ontologies for separate categories (e.g., children's costumes ontology, video game ontology).

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 3:

FIG. 3 is a drawing that illustrates an exemplary user interface rendered according to various examples of the present disclosure. The user interface 300 illustrates an exemplary page for the fictional ACME Online Store 310. The ACME Online Store 310 may be used to purchase goods, purchase services, view pages and/or images related to products and services, etc. The ACME Online Store 310 may include a wide range of products, ranging from electronics to jewelry to house wares. A user (e.g., customer) may search for products by entering the search terms into the search box 320. For example, the user may enter the search terms "blaze man superhero" into the search box 320. After the search is performed, the search results 330 may be displayed on the screen. A certain number of search results may be displayed at a time (e.g., search results 1-3 out of the total 50,000 results). For example, the first three search results may include the Blaze Man DVD 1 350, the Blaze Man DVD 2 360, and the Blaze Man Music CD 370. In some examples, the search results may be displayed according to price, ratings, popularity, reviews, etc. For each product displayed, information on the identity of the manufacturer, the price, rating, item description and/or other item related information may be displayed.

The user interface 300 may include an interest category section 340 that displays interest categories related to the search query. As discussed previously, the category module 260 may categorize the interest items into subject groupings (e.g., interest categories) prior to displaying the subject groupings in a network page along with the search results. For example, in response to the search term "blaze man superhero," the interest section 340 of the display may include the interest categories of Blaze Man Cars, Blaze Man Hats, Blaze Man Posters, Blaze Man Books, Blaze Man Music, and/or Blaze Man DVDs. In some examples, the interest categories may be displayed according to relevance, popularity, priced from high to low, priced from low to high, ratings, etc. For example, Blaze Man Toys may be displayed first because the interest category may have the highest popularity out of the relevant interest categories, while Blaze Man DVDs may be displayed last because it has the lowest popularity out of the relevant interest categories.

Figure 4:

FIG. 4 is a drawing that illustrates an exemplary user interface for displaying interest categories related to the search query. The user interface 400 illustrates an exemplary webpage for the fictional ACME Online Store 410. After the search term (e.g., headphones) is entered into the search box 420, the search results 430 may be displayed on the screen.

A certain number of search results may be displayed at a time (e.g., search results 1-3 out of the total 2,000 results). For example, the first three search results may be the Headphone Extreme by Tomato Corp. 450, the Headphone Ultra by Pickle Corp. 460, and the Headphone Basic by Tomato Corp. 470.

The user interface 400 may include an interest category section 440 that displays interest categories related to the search query. In this example, the interest categories are related to the search term entered by the user (e.g., headphones), but the individual interest categories may relate to different types of headphones. As will be discussed in further detail below, while a user with average knowledge about headphones may search for the generic term "headphones," users with additional knowledge about headphones may enter more specific search terms related to headphones. For example, a user with additional knowledge about headphones may enter "headphones with volume control" or "headphones with microphone" into the search box 420. This additional information allows more knowledgeable users to find specific types of headphones, presumably with more favorable features (e.g., volume control, microphone). In the present technology, the user with less knowledge about headphones may benefit from previously executed searches conducted by users with additional knowledge. Thus, the interest category section 440 may include categories based on popular (and recent) search queries from headphone "experts" (e.g., users with increased knowledge about headphones). In this example, the section 440 may include the additional interest categories of "headphones with volume control," "headphones with microphone," "headphones by Tomato Corp.," and/or "headphones with bass."

Figure 5:

FIG. 5 is a drawing that illustrates an exemplary user interface for recommending similar products based on related search terms. The user interface 500 illustrates an exemplary network page for the fictional ACME Online Store 510. After the search terms (e.g., Magic Kingdom Wand) are entered into the search box 520, the search results 530 may be displayed. A certain number of search results may be displayed at a time (e.g., search results 1-2 out of the total 50 results). For example, the first two search results may be the Magic Kingdom Wand by XYZ Corp. 540, and the Magic Kingdom Wand by ABC Corp. 550.

The user interface 500 may include a display section 560 that provides recommendations for products related to the search terms. In general, the recommendations for similar products may be based on related search terms from a plurality of other users. In contrast to the product categories from FIGS. 3 and 4, the display section 560 in FIG. 5 pertains to individual products. The individual products may include interest items (e.g., products, services, network page links, photos, etc.). As discussed previously, the interest items may be determined based on the search query entered by the user. In some embodiments, the user may select the desired time frame 570 of the related search terms. For example, the user may select an option to see similar products based on related searches from the past week. In other examples, the time frame may be the last day, two days, three days, two weeks, etc. In other words, the similar product recommendations displayed may be based on currently trending interests and search queries. Based on this example, if the user selects to see similar products based on related searches from the past week, the display section 560 may include "Magic Kingdom Stones" 580 and "Magic Forest Sword" 590.

FIG. 6 is a drawing that illustrates an exemplary user interface for recommending similar products based on current events. The user interface 600 illustrates an exemplary network page for the fictional ACME Online Store 610. After the search terms (e.g., Magic Kingdom Wand) may be entered into the search box 620, the search results 630 may be displayed on the screen. A certain number of search results may be displayed at a time (e.g., search results 1-2 out of the total 50 results). For example, the first two search results may be the Magic Kingdom Wand by XYZ Corp. 640, and the Magic Kingdom Wand by ABC Corp. 650.

The user interface 600 may include a display section 660 that provides recommendations for products related to the search terms. In one configuration, a current event or current time period 670 may determine the products that are recommended. For example, if the user enters the search terms during the month of September (e.g., the typical month that students go back to school), then the recommended products may relate to the time period of going back to school. In this example, the recommended products may include Magic Kingdom lunchboxes 680 and/or Magic Kingdom backpacks 690. The recommended products may be related to the search query (e.g., Magic Kingdom wand), but also relate to the current time period of going back to school. As another example, if the user entered the search term "Magic Kingdom wand" during the month of October, then the recommended products may include "Magic Kingdom costumes" due to the proximity of Halloween. In some examples, the recommendations for products related to current events may be determined by similar search queries entered by other users (e.g. a number of other users entered search queries related to "Magic Kingdom costumes" in the month of October). In some configurations, the recommendations for products may be determined from information about user interests 226 (FIG. 1) and/or ontologies 230 included in the data store 220. In addition, historical information related to current events (e.g., Magic Kingdom costumes have been popular in the month of October for the past ten years) may be included in the user interests 226 and/or the currently trending interests 228 of the data store 220.

Figure 7:
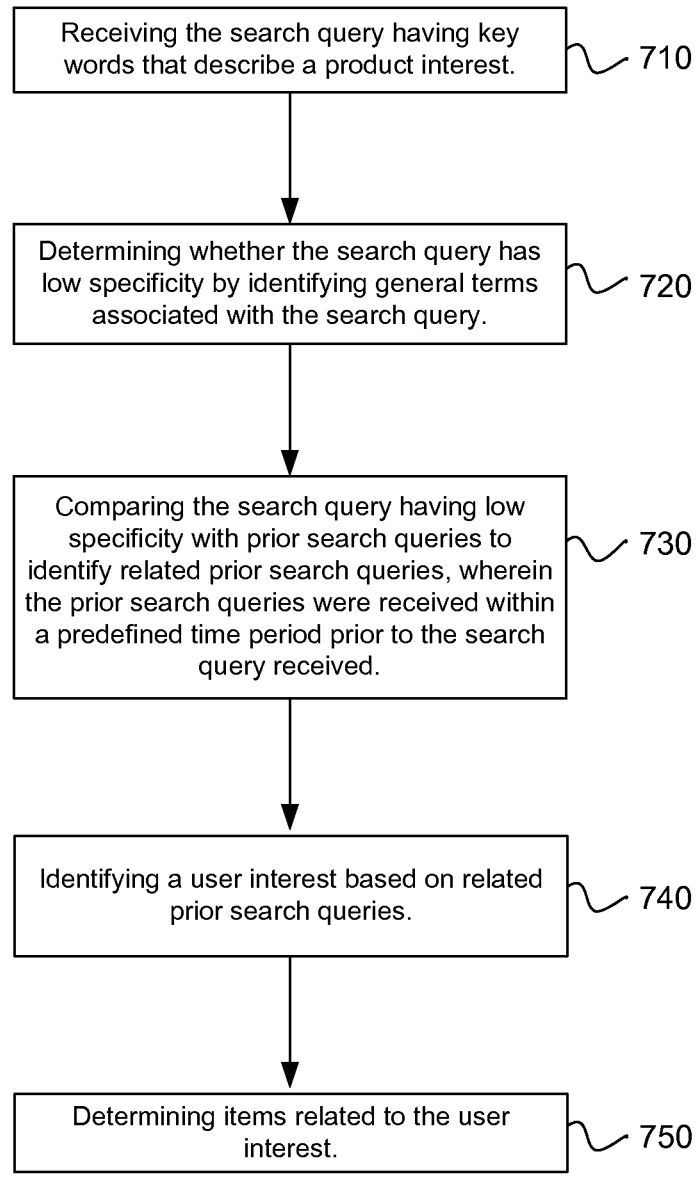
FIG. 7 is a flowchart of an example method for providing search results based on a search query executed in a computing device in the networked environment of FIG. 1.

FIG. 7 illustrates an example of a method for providing interest based search results based on a search query. The method may include the operation of receiving the search query having key words that describe a product interest, as in block 710. For example, a user may enter the search query into a search engine. The search query may describe a product interest (e.g., movies, video games, books, cell phones, etc.). In some embodiments, the product interest may include an interest for services (e.g., web storage, movie subscription service, etc.). The search query may include key words that describe the nature of the product or service. For example, a user interested in "Brand Rocket sneakers, model 10" includes key words describing the brand (e.g., Rocket), the type of product (e.g., sneakers), and the model of the product (e.g., model 10).

The search query may be determined to have low specificity by identifying general terms associated with the search query, as in block 720. In other words, the search query may be generic when the search query includes general terms and does not include specific terms. In some examples, information included in the key words 224 may be used to determine whether the search terms are generic. Search terms may be considered general when a large number of search results are returned for the search terms or the terms are simple dictionary terms. In addition, search terms may be considered general when they have been identified by a heuristic model or a human expert as general. For example, a search query for "Brand Rocket sneakers, model 10" may be considered to have general search terms because the search query most likely describes a popular brand and model of the sneakers. In this example, no search terms are peculiar and/or out of the ordinary. As another example, a search query for "Brand Rocket sneakers, model 10, new condition, free shipping, pink color" may be considered to have specific search terms because the search query most likely describes an unique version of the sneakers. In addition, the additional criteria (e.g., new condition, free shipping, pink color) increases the specificity of the search query. Thus, specific search terms may be identified when the search terms are known attributes of items.

The search query having low specificity may be compared with prior search queries to identify related prior search queries, where the prior search queries were received within a predefined time period prior to the search query received, as in block 730. For example, the search query "Rocket sneakers, model 10" may be compared with prior search queries. In some examples, the key words of the search query may be compared with the key words of the prior search queries. For example, the prior search queries may include "Rocket sneakers, model 11" and "Rocket performance socks for model 10." In this example, the key words of "Rocket" and "model 10" of the prior search queries are related to the search query "Rocket sneakers, model 10," so these prior search queries are identified as being related to the search query. In addition, fingerprinting methods and/or correlation metrics may be used to compare the executed search queries with the search query in order to categorize related executed search queries together. In some examples, the prior search queries may be received within a predefined time period prior to the search query received (e.g., a day, two days, three days, a week, two weeks, a month, a season). Additionally, the predefined time period may depend on the type of item and/or the length of time a certain item may be popular.

A user interest may be identified based on the related prior search queries, as in block 740. The user interest may be inferred based on the key words and/or product areas associated with the prior search queries. For example, the related prior search queries may include "Rocket sneakers, model 11" and "Rocket performance socks for model 10." In this example, the user interest identified may include "Rocket sneakers" and/or "products related to Rocket sneakers, model 10." In some examples, a user interest may be identified based on a more remote connection (e.g., other products by Rocket, such as shorts and shirts).

Items relating to the user interest may be determined, as in block 750. The items may include recommendations for products, services, webpage links to product reviews and/or other information, photo albums, etc. In general, the items may include information related to and/or containing similar subject matter to the user interest. In some examples, the item titles and/or item descriptions may include terms related to the user interest. For example, the user interest may be identified as Rocket sneakers" and/or "products related to Rocket sneakers, model 10." In this example, the items may include a webpage link for an expert product review for "Rocket sneakers, model 10," a product recommendation for "Rocket sneakers, model 11," and/or photos of the upcoming "Rocket sneakers, model 12."

In some examples, the items related to the user interest may be displayed along with the search results. For example, the items may be displayed to the user in a network page along with the search results. In other words, the search query entered by the user may result in general search results, but other search result information (e.g., items) may also be displayed based on identified user interests. In some examples, the items may be displayed alongside the search results. In an alternative example, the items may be displayed on a separate section of the network page. For example, the items may be displayed together on the right-hand side of the display screen.

In some example configurations, currently trending interests may be identified by analyzing the prior search queries. In other words, by analyzing the prior search queries from a given time period (e.g., the past three days), currently trending interests (e.g., recently popular search terms) may be identified. Further, currently trending interests may be identified by analyzing the frequency of related and/or similar prior search queries. When the frequency and/or number of searches that relate to the same interest ("e.g., Fire Man movie action figures") increases, then the interest may be considered as currently trending. The currently trending interests may be compared with the user interest for determining items for display. For example, the user interest of a user interested in "Fire Man movie toys" may be compared with the currently trending interest of "Fire Man movie action figures," and based on the comparison, items related to both "Fire Man movie toys" and "Fire Man movie action figures" may be displayed.

In other examples, the prior search queries having key words related to the search query may be categorized into one or more subject groupings. The subject groupings may be determined from the key words of the prior search queries that relate to the search query. For example, a user may search for "Brand Octopus televisions." The prior search queries related to the search "Brand Octopus televisions" may include Octopus televisions of specific types (e.g., LCD, plasma), screen sizes (e.g., 42 inches, 50 inches), and/or specific features (e.g., 1080p). In other words, the key words from the prior search queries include the key words of the search query (e.g., "Brand Octopus televisions"), but may also contain additional key words. These additional key words may be helpful to the user because the key words educate the user about additional options related to "Octopus televisions." Thus, the prior search queries may be categorized into subject groupings, and the generated categories and/or related items may be displayed along with the search results. In this example, the subject groupings may include Octopus LCD televisions, Octopus plasma televisions, Octopus 42 inch televisions, Octopus 50 inch televisions, and/or Octopus 1080p televisions. By selecting a particular subject grouping, the user may be directed to individual products, services, etc. that relate to that subject grouping.

Figure 8:
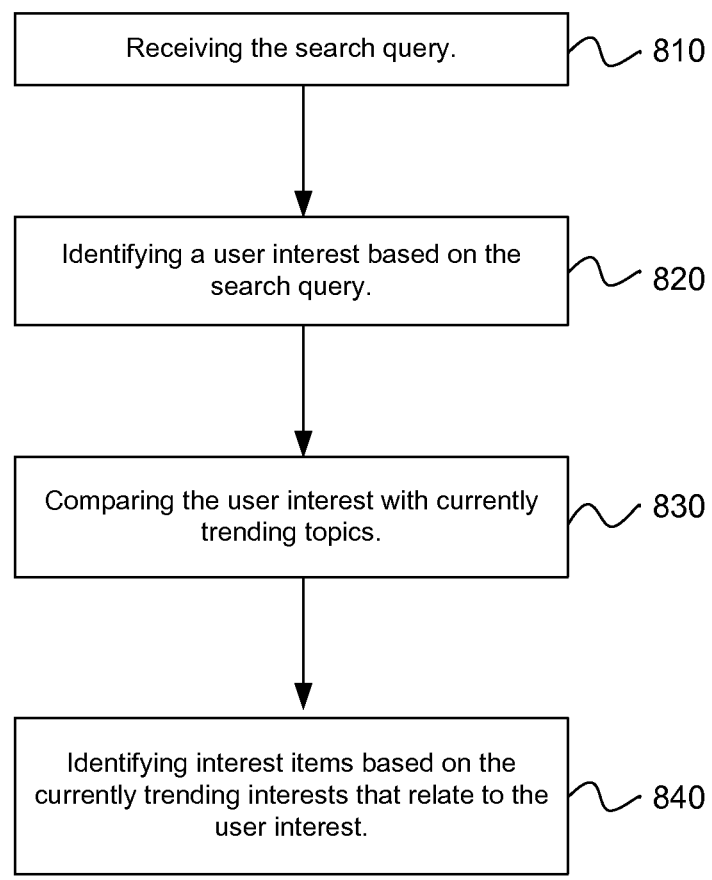
FIG. 8 is a flowchart of another exemplary method for providing search results based on a search query executed in a computing device in the networked environment of FIG. 1.

FIG. 8 illustrates an example of a method for providing search results based on a search query. The method may include the operation of receiving the search query, as in block 810. For example, a user may enter the search query into a search engine. The search query may describe a product interest (e.g., movies, video games, books, cell phones). In some examples, the product interest may include an interest for services (e.g., web storage, movie subscription service). The search query may include key words that describe the nature of the product or service. The search query may also be determined to have low specificity by analyzing the entropy of activities performed after the search results are displayed. For example, a low specificity query generally produces a large number of search results, and may result in a number of irrelevant results. In contrast, a high specificity query generally produces a small number of search results. In general, when the user enters a very broad search query that produces many results, the user may spend a long amount of time not finding the exact results desired or may immediately enter a new search result. In contrast, by entering a search query with specific terms, the user may view a number of relevant results. Thus, the specificity of the search query may be determined by analyzing the entropy of activities performed by the user.

A user interest may be identified based on the search query, as in block 820. In general, the user interest may be a product, service, etc. that the user may find interesting based on their search query. In some examples, the user interest may be identified by analyzing the key words of the search query. The user interest may also be inferred based on the key words and/or product areas associated with the search query. For example, a user may search for "newest music CD from artist Red Roses," where Red Roses sings country music. In this example, the user interests based on the search query may be determined as "artist Red Roses" and "Red Roses music albums." In some examples, the user interest may be a broader category (e.g., similar country artists to Red Roses, similar music CDs).

The user interest may be compared with currently trending interests, as in block 830. In some examples, the currently trending interests may be identified based on a plurality of executed search queries received within a predefined time period prior to the search query being received. In other words, the currently trending interests may include popular search queries from a recent time period. The predefined time period prior the search query being received may include a day, two days, three days, a week, a month, and/or a season. Further, the currently trending interests may be identified by analyzing the plurality of executed search queries. In particular, the frequency of related and/or similar executed search queries may be considered in determining whether the interest is currently trending. The currently trending interests may be identified by applying heuristics to the executed search queries. In particular, heuristics may be used to identify currently trending interests based on past information that allows for some intelligent guesswork. For example, a currently trending interest may be deduced by realizing that certain known interests almost always trend at certain times of the year. As another example, a currently trending interest may be deduced by realizing that certain interests are almost always related to other interests, and that if one interest is currently trending, then it may be very likely that the related interest is currently trending as well.

In some examples, the currently trending interests dynamically vary based on the plurality of executed search queries received within a predefined time period prior the search query being received. For example, a large number of search queries may have been executed for the latest smart phone "Supernova 5" during the past week. In this example, "Supernova 5" may be considered a currently trending interest. However, if the number of search queries executed for "Supernova 5" decrease significantly during the following week, the "Supernova 5" may cease being a currently trending interest. The currently trending interests may dynamically vary based on information collected from magazines, newspapers, journals, books, periodicals, newsletters, online blogs, online discussion forums, social media websites, educational websites, and/or current event websites. For example, social media websites and/or current event websites may recognize that the newest smart phone "Supernova 5" has created a strong media buzz because many users are writing and/or discussing the "Supernova 5" on discussion boards and online forums. Thus, this information from other sources may contribute to an interest being considered as currently trending.

Interest items based on the currently trending interests that relate to the user interest may be identified, as in block 840. For example, the user interest (e.g., tablet computers) may relate to currently trending interests (e.g., Cheetah tablet computers). Based on the related interests, specific interest items may be identified. The interest items may include products, services, etc. that are related in subject matter to the user interests. For example, the interest items may include multiple models of Cheetah tablet computers, similar tablet computers from different manufacturers, and/or similar products from Cheetah. In addition, the interest items may include services, links to product reviews, photo albums, and/or any other information related to Cheetah tablet computers. In some examples, the interest items may include interest categories, where the interest categories may be based on the currently trending interests that relate to the user interest. For example, an interest category may include "Cheetah tablet computers," and the interest items (e.g., individual Cheetah tablet computer models) related to the interest category may be included within the interest category.

The interest items may be displayed as product recommendations to the user along with the search results. In some examples, the interest items may be displayed in order according to the popularity of the currently trending interests. In other words, the interest items relating to the most popular trending interests may be displayed first, while the interest items relating to the least popular trending interests may be displayed last. In some examples, the popularity of the currently trending interests may be based on the number of executed search queries received.

In some configurations, an ontology may be formed based on the currently trending interests. For example, currently trending interests may include "Albus costumes" and "Silas costumes," and this information may be used to create a costumes ontology. The costumes ontology may describe the relationship between different types of costumes (e.g., users interested in "Albus costumes" generally also like "Silas costumes"). In some examples, the user interest may be compared with the ontology. For example, a user interested in "Gwen costumes" may be compared to the information found in the costumes ontology. As a result, the currently trending interests from the ontology that relate to the user interest may be identified. In this example, the currently trending interests from the costumes ontology may include "Albus costumes" and Silas costumes." In some examples, interest items may be determined based on the currently trending interests from the ontology that relate to the user interest. For example, the interest items relating to the currently trending interests "Albus costumes" and "Silas costumes" from the costumes ontology may be determined because the user is interested in "Gwen costumes."

In some examples, the key words from the plurality of executed search queries may be identified. The executed search queries having key words of high specificity may be deleted using heuristics. The key words in the executed search queries may be compared with the key words in the search query. After the comparison, the executed search queries that contain the same key words as the search query may be identified. For example, the executed search queries may include "Cheetah computer, model A," "Cheetah computer with printer," and "Cheetah computer with ultra II graphics." In addition, the search query may include "Cheetah computer." In this example, the key term of the search query (e.g. "Cheetah computer") is included in each of the executed search queries. The executed search queries that contain the same key word as the search query may be categorized into expert groupings. In this example, the executed search queries may be categorized as "Cheetah Computer—Model A," "Cheetah computer w/ Printer," and "Cheetah computer w/ Ultra II Graphics." In this example, the expert categories relate to Cheetah computers, but one expert grouping relates to Model A, a different group relates to printers, and the last group relates to graphics. In other words, each expert grouping may have a different characteristic from each of the other expert groupings. Furthermore, the different characteristic relates to a key word not contained in the search query. For example, none of the search terms "Model A," "printer," and "Ultra II Graphics" were included in the search query. The expert groupings may be displayed as part of the search results, where each expert grouping may contain recommendations for products and/or services based on the key words of the search query.

Figure 9A:
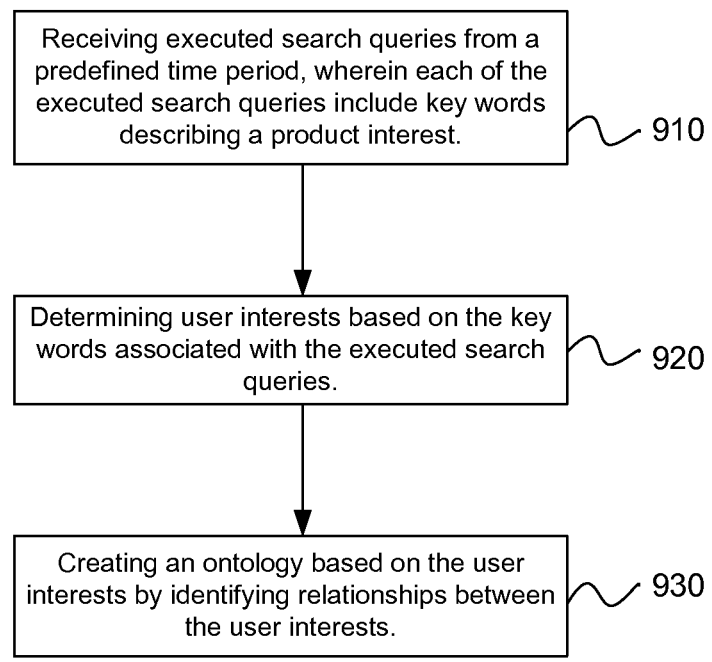
FIG. 9A is a flowchart of an exemplary method for creating ontologies based on executed search queries executed in a computing device in the networked environment of FIG. 1.

FIG. 9A illustrates an example of a method for creating ontologies based on executed search results. The method may include the operation of receiving executed search queries from a predefined time period, wherein each of the executed search queries include key words describing a product interest, as in block 910. User interests may be determined based on the key words associated with the executed search queries, as in block 920. An ontology may be created based on the user interests by identifying relationships between the user interests, as in block 930. In some examples, the ontology may be created by identifying user interests that are related based on related key words included in the executed search queries. In other words, the relationship between the user interests may include that of similarity. For example, it may be determined that users that enjoy playing Galaxy fantasy video games also enjoy playing Quasar fantasy video games, based on the similarity between the fantasy video games. Therefore, the user interest of playing Galaxy fantasy video games may be related to the user interest of playing Quasar fantasy video games. In this case, the relationship between Galaxy video games and Quasar video games may be added to a video game ontology. Furthermore, the relationship between the user interests may be used to determine interest items. For example, a user with an interest in "Particle fantasy video games" may be recommended both Galaxy and Quasar fantasy video games because of the relationship between the Galaxy and Quasar video games stored in the video game ontology.

In some examples, the ontology may be created by identifying user interests that are not related to one another. In other words, the relationship between the user interests may include that of dissimilarity. In some examples, it may be determined that user interests are unrelated based on unrelated key words included in the executed search queries. For example, it may be determined that users that enjoy playing Galaxy fantasy video games do not enjoy playing Integral educational video games. Therefore, the user interest of playing Galaxy fantasy video games may not be related to the user interest of playing Integral educational video games. In this case, the relationship between Galaxy video games and Integral video games may be added to the video game ontology. Thus, a user having an interest in playing Galaxy fantasy video games may not be recommended Integral educational video games based on the relationship between Galaxy and Integral video games stored in the video game ontology.

The ontology may receive additional information about inferred user interests based on the relationships between the user interests. For example, the video game ontology may include the information that the user interest of playing Galaxy fantasy video games may be related to the user interest of playing Quasar fantasy video games. Based on this relationship, it may be inferred those the user interest of playing Galaxy and Quasar fantasy video games also relates to the user interest of playing Differential fantasy video games. In this example, the relationship to Differential fantasy video games may be inferred based on the similarities between the fantasy video games, even though there may be no executed search queries that support this conclusion. Rather, this information may be inferred by similar products, subject matters, etc. and then added to the associated ontology (e.g., the video game ontology). In other words, the additional user interests inferred may be added to the associated ontology.

Figure 9B:
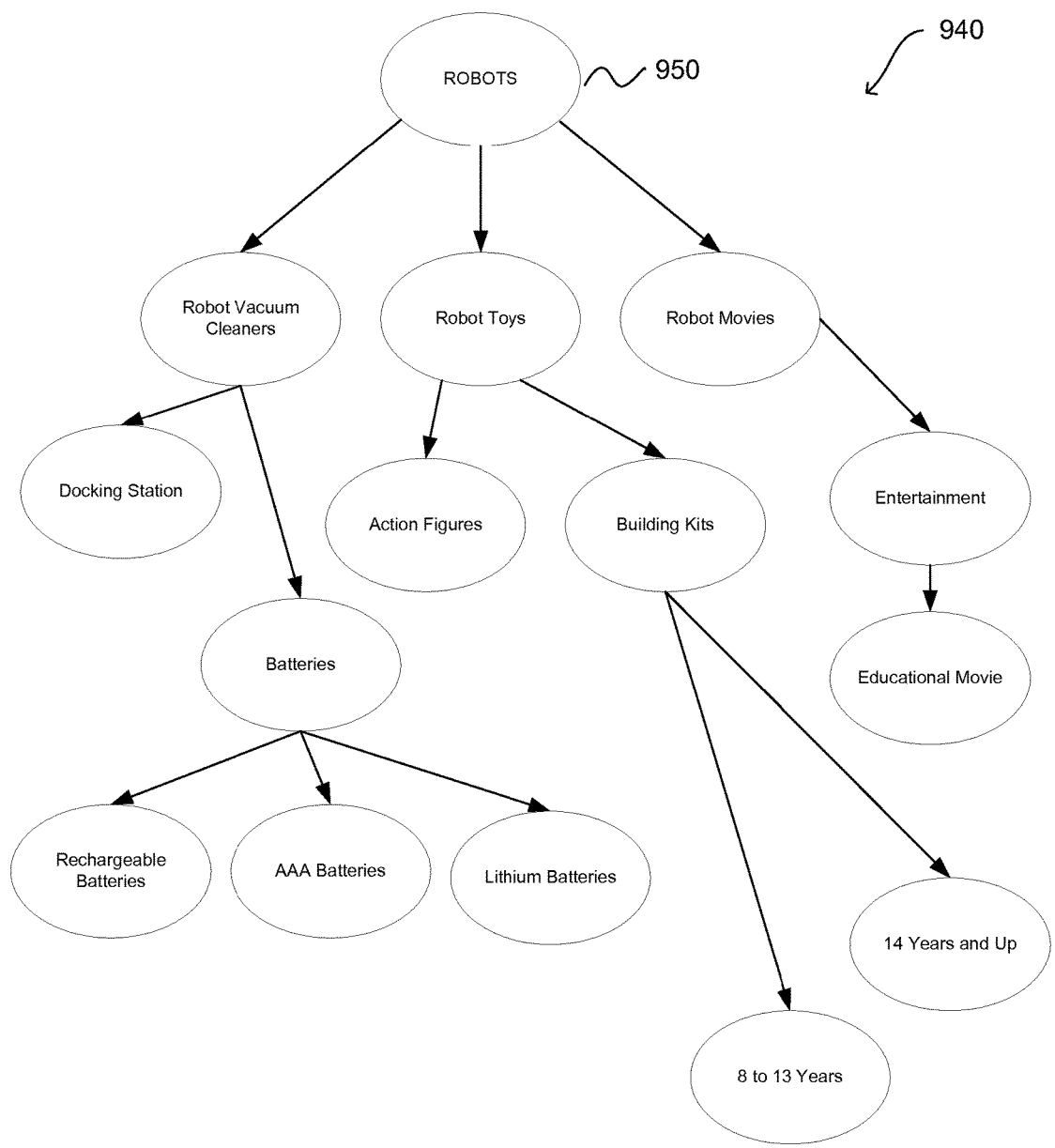
FIG. 9B is an exemplary ontology tree based on executed search queries executed in a computing device in the networked environment of FIG. 1.

FIG. 9B illustrates an exemplary ontology model 940 based on the executed search queries. In some examples, the ontology model may take the form of a tree or a categorization model. The ontology model 940 example may include a robot ontology tree 950. The robot ontology tree 950 may include a number of different branches related to robot interests. In addition, the robot ontology tree may illustrate the relationships between the different robot interests. For example, the robot ontology tree 950 may include different sub-interests related to robots, such as robot vacuum cleaners, robot toys, and robot movies. The robot toys may further include action figures and building kits. In other words, action figures and building kits are related as both being robot toys. The building kits may be grouped as kits for ages 8 to 13, as well as for age 14 and up. Under the sub-interest related to robot movies, a popular movie type may be related to entertainment. In addition, robot movies may include educational movies. The robot vacuum cleaners may include docking stations and batteries. The batteries may include rechargeable batteries, AAA batteries, and lithium batteries. As discussed in FIG. 9A, the robot ontology tree 950 may be created based on the user interests by identifying relationships between the user interests. As an example, a search query for "robot movies" may utilize the robot ontology tree 950 for determining interest items related to the search query.

Figure 10:
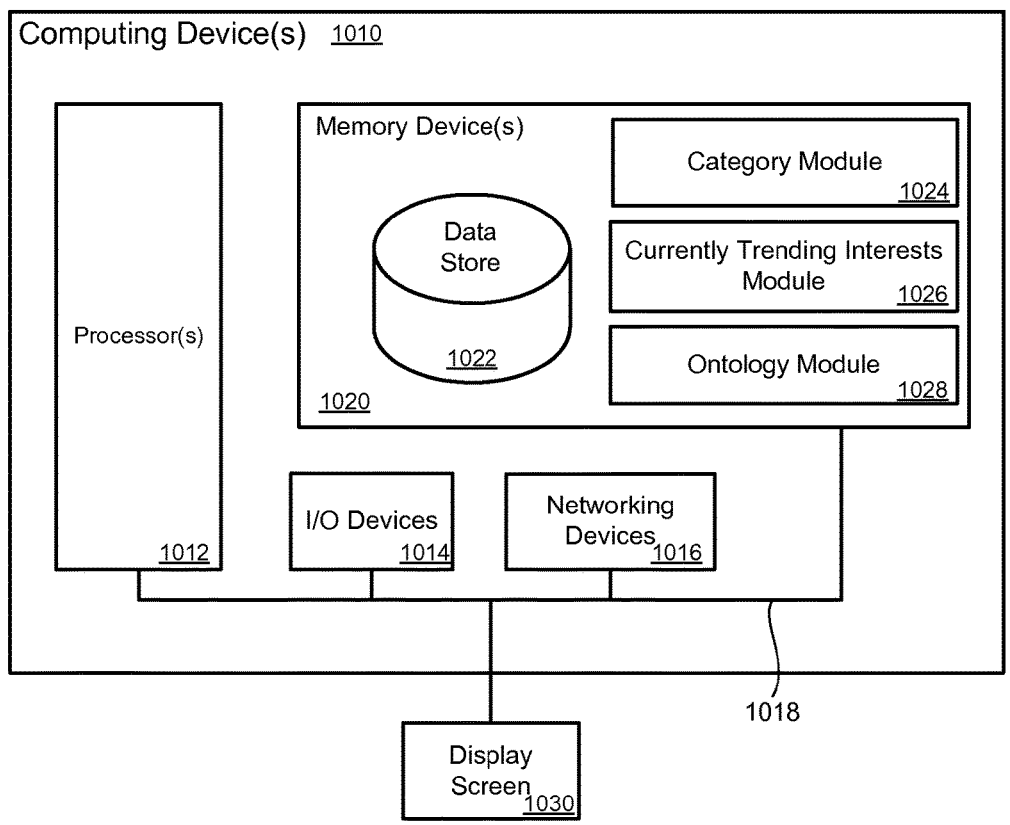
FIG. 10 is a schematic block diagram that provides an example illustration of a computing device employed in the networked environment of FIG. 1.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules that are executable by the processor(s) 1012 and data for the modules. Located in the memory device 1020 are modules executable by the processor. For example, a category module 1024, the currently trending interests module 1026, and the ontology module 1028, and other modules may be located in the memory device 1020. The modules may execute the functions described earlier. A data store 1022 may also be located in the memory device 1020 for storing data related to the modules and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen 1030 that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.\

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for providing interest-related search results, the method comprising:
under the control of one or more processors and memory configured with executable instructions:
receiving a search query having key words that describe a product interest;
determining whether the search query has low specificity by identifying general terms in the search query;
comparing the search query having low specificity with prior search queries to identify related prior search queries, wherein the prior search queries were received within a predefined time period prior to the search query received;
identifying a user interest based on related prior search queries;
identifying currently trending interests based on the prior search queries;
comparing the currently trending interests with the user interest;
determining items related to the user interest and the currently trending interests; and
sending a listing of the items related to the user interest over a computer network for display on a user interface at a computing device along with search results, and the items include recommendations for products or services based on the user interest.

2. The method of claim 1, wherein comparing the search query having low specificity with prior search queries to identify related prior search queries comprises determining that the search query relates to key words associated with the prior search queries.

3. The method of claim 2, further comprising:
categorizing the prior search queries having key words related to the search query into one or more subject groupings; and
displaying the subject groupings along with the search results.

4. A computer-implemented method for providing interest-related search results, the method comprising:
under the control of one or more processors and memory configured with executable instructions:
receiving a search query that describes a product interest;
determining that the search query includes general terms;
determining that the search query has low specificity based on the general terms included in the search query;
comparing the search query having low specificity with prior search queries to identify related prior search queries;
identifying a user interest based on related prior search queries;
identifying currently trending interests based on the prior search queries;
comparing the currently trending interests with the user interest;
determining items related to the user interest and the currently trending interests; and
sending a listing of the items related to the user interest over a computer network for display on a user interface at a computing device, and the items include recommendations for products or services based on the user interest.

5. The method of claim 4, further comprising analyzing an entropy of activities performed by a user for determining the low specificity of the search query.

6. The method of claim 4, further comprising receiving the prior search queries within a predefined time period prior to the search query received.

7. The method of claim 4, further comprising:
determining that the search query relates to key words associated with the prior search queries.

8. The method of claim 4, further comprising:
categorizing the prior search queries having key words related to the search query into one or more subject groupings, and
displaying the subject groupings along with the search results.

9. The method of claim 4, further comprising creating ontologies comprising identifying relationships between user interests that are related based on key words related to the search query.

10. The method of claim 9, wherein identifying relationships between the user interests comprises identifying user interests that are not related based on the key words, wherein creating an ontology based on the user interests further comprises:
inferring additional user interests based on the relationships between the user interests; and
adding the additional user interests to the ontology.

11. A system for providing search results based on a search query, the system comprising:
at least one processor;
at least one memory device including instructions that, when executed by the at least one processor, causes the system to:
receive a search query that includes terms describing a product interest;
determine whether the search query has low specificity by identifying general terms in the search query;
compare the search query having low specificity with executed search queries to identify related executed search queries, wherein the executed search queries were received within a predefined time period prior to the search query received;
identify a user interest based on the related prior search queries;
identifying currently trending interests based on the executed search queries;
comparing the currently trending interests with the user interest;
determining interest items related to the user interest and the currently trending interests; and
send a listing of the interest items over a computer network for inclusion on a network page to be displayed on a user interface at a computing device along with search results, and the interest items include recommendations for products or services based on the user interest.

12. The system of claim 11, wherein the instructions, when executed by the at least one processor, further causes the system to: categorize the interest items into subject groupings and displaying the subject groupings in a network page along with the search results.

13. The system of claim 11, wherein the instructions, when executed by the at least one processor, further causes the system to: create an ontology based on user interests by identifying user interests that are related based on similar key words included in the executed search queries.

* * * * *